United States Patent
Ge et al.

(10) Patent No.: US 10,318,297 B2
(45) Date of Patent: Jun. 11, 2019

(54) METHOD AND APPARATUS FOR OPERATING A SELF-TIMED PARALLELIZED MULTI-CORE PROCESSOR

(71) Applicant: HUAWEI TECHNOLOGIES CO., LTD., Shenzhen (CN)

(72) Inventors: Yiqun Ge, Kanata (CA); Wuxian Shi, Kanata (CA); Lan Hu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 14/611,140

(22) Filed: Jan. 30, 2015

(65) Prior Publication Data
US 2016/0224349 A1     Aug. 4, 2016

(51) Int. Cl.
    *G06F 9/30*        (2018.01)
    *G06F 1/20*        (2006.01)
    (Continued)

(52) U.S. Cl.
    CPC ............ *G06F 9/30145* (2013.01); *G06F 1/20* (2013.01); *G06F 1/3206* (2013.01); *G06F 1/329* (2013.01); *G06F 1/3287* (2013.01); *G06F 9/30* (2013.01); *G06F 9/30072* (2013.01); *G06F 9/3836* (2013.01); *G06F 9/3838* (2013.01); *G06F 9/3871* (2013.01); *G06F 9/3889* (2013.01)

(58) Field of Classification Search
CPC .............. G06F 9/3822; G06F 9/30072; G06F 9/30145; G06F 9/38; G06F 9/3836; G06F 9/3838; G06F 9/3871; G06F 9/3889; G06F 9/46; G06F 8/456; G06F 8/4441
See application file for complete search history.

(56) References Cited

U.S. PATENT DOCUMENTS 6,282,583 B1 * 8/2001 Pincus ................ G06F 15/8023
                                                              712/13
8,181,168 B1 * 5/2012 Lee ......................... G06F 8/445
                                                             717/149
(Continued)

FOREIGN PATENT DOCUMENTS

CN       101950282 A     1/2011
CN       102707952 A     10/2012

OTHER PUBLICATIONS

Texas A&M Lecture, OpenMP by Example, Oct. 25, 2013, All Lecture Slides.*

(Continued)

*Primary Examiner* — Benjamin P Geib
*Assistant Examiner* — Andrew J Cromer
(74) *Attorney, Agent, or Firm* — Norton Rose Fulbright Canada LLP; Niall Cooney

(57) ABSTRACT

A self-timed parallelized multi-core processor has an instruction decoder unit for receiving a program code instruction, determining an operating code and latency for the instruction, and assigning a loop index to the instruction. An instruction decomposer creates a primitive by decomposing the instruction, replacing the loop index with a core index, and broadcasting the primitive. Self-timed processing cores each having a unique core index compare the core index to their unique processing core index. The processing cores act on the primitive when their processing core index is within a threshold of the core index.

20 Claims, 10 Drawing Sheets

(51) Int. Cl.
*G06F 9/38* (2018.01)
*G06F 1/3206* (2019.01)
*G06F 1/3287* (2019.01)
*G06F 1/329* (2019.01)
*G06F 1/32* (2019.01)

(56) References Cited

U.S. PATENT DOCUMENTS

| | | | | |
|---|---|---|---|---|
| 8,572,355 | B2* | 10/2013 | Rozas | G06F 9/30058 |
| | | | | 712/22 |
| 8,677,106 | B2* | 3/2014 | Nickolls | G06F 9/30072 |
| | | | | 712/226 |
| 9,223,714 | B2* | 12/2015 | Breternitz | G06F 12/0875 |
| 9,329,870 | B2* | 5/2016 | Muff | G06F 9/30145 |
| 2004/0044716 | A1 | 3/2004 | Colon-Bonet | |
| 2010/0199257 | A1* | 8/2010 | Biggerstaff | G06F 8/76 |
| | | | | 717/104 |
| 2010/0306753 | A1* | 12/2010 | Yi | G06F 8/4452 |
| | | | | 717/149 |
| 2011/0153453 | A1* | 6/2011 | Ghafoor | G06Q 10/02 |
| | | | | 705/26.9 |
| 2012/0079466 | A1* | 3/2012 | Gonion | G06F 8/433 |
| | | | | 717/150 |
| 2012/0167069 | A1* | 6/2012 | Lin | G06F 8/456 |
| | | | | 717/160 |
| 2013/0166879 | A1 | 6/2013 | Sun et al. | |
| 2013/0191817 | A1* | 7/2013 | Vorbach | G06F 8/4441 |
| | | | | 717/150 |
| 2013/0205123 | A1* | 8/2013 | Vorbach | G06F 9/30043 |
| | | | | 712/221 |
| 2013/0290943 | A1* | 10/2013 | Uliel | G06F 9/30032 |
| | | | | 717/160 |
| 2015/0058832 | A1* | 2/2015 | Gonion | G06F 8/433 |
| | | | | 717/150 |

OTHER PUBLICATIONS

Patterson, David A., and John L. Hennessy, "Computer Organization and Design: The Hardware/Software Interface", 2004, Morgan Kaufmann, n.d. Print., 3rd Edition, Pertient pp. (63, 140-141, 350-353, 376, 439).*
English Translation of Abstract of CN102707952A; 1 page.
English Translation of Abstract of CN101950282A; 2 pages.
WIPO; WO 2014/105174A1 dated Jul. 3, 2014; Intel Corporation; 73 pages.

* cited by examiner

```
for (i=0; i<2048; i++)
{
    R7[i] = R8[i] + R9[i];
    R10[i] = R7[i] * R9[i];
    ......
}
```

METHOD AND APPARATUS FOR OPERATING A SELF-TIMED PARALLELIZED MULTI-CORE PROCESSOR

FIELD OF THE DISCLOSURE

The present disclosure relates to processors, and in particular relates to processors with multiple or many cores.

BACKGROUND

As more computing power is required for computing applications, trends in the past several decades have been to provide processors with increasing number of transistors, single thread performance, frequency and power utilization. In the last decade the number of cores has also started to increase within a processor.

While the number of transistors continues to increase exponentially, limits are being approached with regard to single thread performance, frequency and the typical power on a processor. Therefore, in order to increase processing power, new technologies are employing hundreds or thousands of cores, which are grouped in a multi-core processor to tackle program code in a highly parallel manner.

Multi-core processors tend to have high power consumption and generate significant heat. Such high power consumption and heat make the processors inefficient for applications such as mobile handsets, which require low power per processing instruction, measured in giga-floating point operations per second, per watt (GFLOPS/W).

SUMMARY

In one embodiment the present disclosure provides a self-timed parallelized multi-core processor. The processor has an instruction decoder unit configured to receive a program code instruction, determine an operating code and latency for the program code instructions, and assign a loop index to the program code instruction. The processor further includes an instruction decomposer unit coupled to the instruction decoder unit, the instruction decomposer configured to create a primitive by decomposing the program code instruction, replace the loop index in the primitive with a core index, and broadcast the primitive. The processor further includes a plurality of self-timed processing cores coupled to the instruction decomposer unit, each core having a unique core index and having a dispatch unit for comparing the core index in the primitive with the core index of its processing core, each core being configured to act on the primitive when the index of the processing core is within a threshold of the core index.

In another embodiment the present disclosure further provides a method of operating a self-timed parallelized multi-core processor. The method includes fetching program code instructions from memory, decoding the program code instructions and obtaining a latency and loop index, creating a primitive by decomposing the program code instructions and by replacing the loop index with a core index, broadcasting the primitive to a plurality of processing cores; and at each processing core, acting on the primitive only when an index of the processing core is within a threshold of the core index of the primitive.

BRIEF DESCRIPTION OF THE DRAWINGS

The present disclosure will be better understood with reference to the drawings, in which:

FIG. 2 is a block diagram illustrating an instance of a parallelized software model for a multi-core processor;

DETAILED DESCRIPTION OF THE DRAWINGS

The present disclosure provides for a multi-core processor, in which each core is self-timed and can be activated or deactivated dynamically for each instruction. The ability to turn off or on a core for processing an instruction allows for power savings for the processor.

Trends in processor development over the last several decades show that theoretical limits are being reached in some areas of processor design. In particular, various factors in processor development include an increase in the number of transistors, single thread performance, frequency, typical power, and number of cores in processors.

In one area of processor design, the number of transistors in a microprocessor has increased exponentially in the last three decades.

Similarly, the single thread performance for a processor has also generally increased exponentially in the last several decades. However, in the last decade the curve has leveled off.

The frequency a processor operates at also increased exponentially until approximately one decade ago, at which point, the curve started to level. Accordingly, the frequency at which a processor operates may be reaching theoretical maximums.

Further, the typical power consumption of a processor has also increased over the last several decades.

Conversely, the number of cores in a processor was typically one until approximately 2005, at which point the number of cores in a processor started to increase.

Based on the above, future increases in processing capacity in a processor will likely be achieved through increasing the number of cores in a processor. However, when such cores are all clocked with a global clock tree, all cores consume power, ever if an individual core is not processing instructions.

Figure 1:
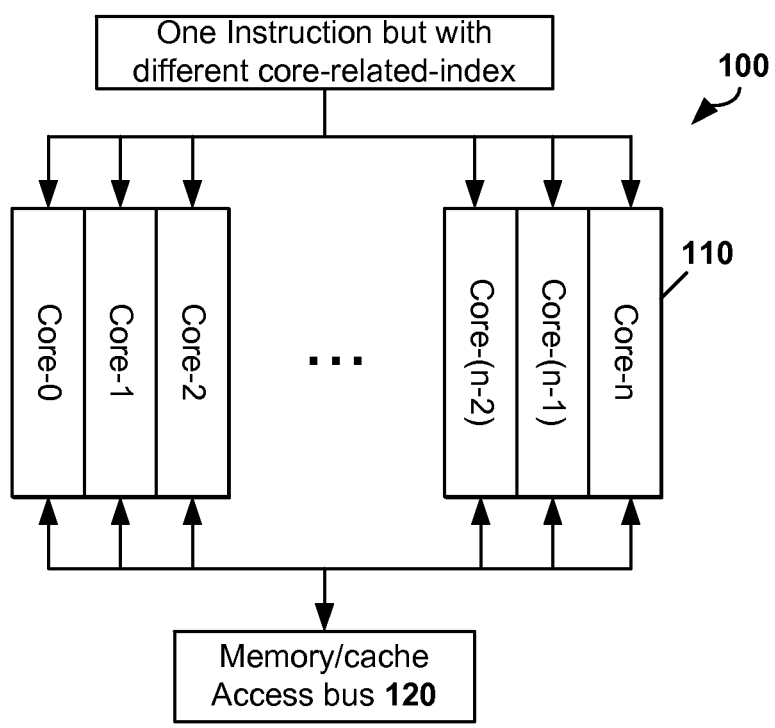
FIG. 1 is a block diagram illustrating a prior art parallelized multi-core processor.

Reference is now made to FIG. 1, which shows a prior art parallelized multi-core processor. Such processor, may, for example, be referred to as a grid processor, or slice-based processor, or 1D multi-core processor. In the embodiment of FIG. 1, N cores 110 are shown within a processor 100.

In the embodiment of FIG. 1, one instruction is provided to each of the cores, where the instruction only differs with regard to a core related index. Thus, one instruction is fetched to multiple identical processing cores in parallel, and the processing units of the cores execute the same instruction, but with a different core related index. Such processing may be used, for example, in a program having a loop, where each iteration of the loop (loop body) is independent of previous iterations of the loop.

For example, reference is made to FIG. 2, which shows a diagram for the parallel processing of a loop. In particular, a typical simplified loop is shown with regard to block 210. As seen in block 210, the process loops 2,048 times and performs various calculations. In the embodiment of FIG. 2 the calculations within each loop are independent of calculations in other iterations of the loop.

In particular, a first calculation in the loop of block 210 provides a result that is an addition of two other numbers.

A second calculation includes the sum of the first calculation multiplied by a number. Other calculations or instructions are also possible, thereby forming a stream. The present disclosure is not limited to any particular loop body.

In the embodiment of FIG. 2, an iteration of the loop, referred to as a loop body, is independent from the next or previous iteration. Thereby, a loop body can be regarded an independent instruction stream. Note that the instruction streams on different iterations are the same, but operate on different data.

As seen by blocks 220, the loop may then be broken into a plurality of independent instruction streams. In the example of FIG. 2, 2,048 cores exist, each being assigned a separate instruction stream, which corresponds to a loop body. However, even if such number of cores didn't exist then the processing could still occur in parallel for the number of cores on the processor, with unprocessed iterations of loops being processed in a subsequent clock time.

As seen by in FIG. 2, in a first step in each core the addition is calculated and in the second step in each core the multiplication value is calculated.

Thus, in a first core, shown by block 222, the values for i=0 are calculated. In a second core, shown by block 224, the values for i=1 are calculated. The remaining cores perform calculations for different values of i, and at the last core, shown by block 226, the values for i=2,047 are calculated.

Based on FIG. 2, software is able to be unraveled in an iteration independent loop into multiple independent instruction streams. Each instruction stream is loaded onto one core, resulting in the software loop being executed with maximum parallelism.

Referring again to FIG. 1, the output of the cores 110 is provided to a memory, cache or access bus 120, as shown in the embodiment of FIG. 1.

The use of the processor 100 needs software to be highly parallelized in order to provide for efficiency in processing. Further, interactivity among the cores 110 destroys the parallelism and is therefore typically avoided.

Each core 110 has dedicated access to some resources such as register files, memory ports, among other resources.

All cores are synchronized to the same pipeline to ensure that they are started and completed at the same clock. This results in low power efficiencies. In particular, a part of the cores are clocked even without a task, using power without contributing the calculations.

The cores of processor 100 are difficult to switch off. In many situations, a software application cannot use all of the cores 110 at all times. It is anticipated that some of the cores 110 will be idle some of the time. In a synchronous design, a power gating is required to switch off idle cores. However, such power gating requires a certain level of granularity. For example, it may be considered much more costly to allocate a power island for single core than for a group of cores. Accordingly, the granularity for a synchronous design may be considered to be great. Thus, for example, if a loop has 40 iterations, but a processor includes 1,000 cores, only the first 40 cores are performing useful functionality, while the remaining 960 cores are still being clocked and therefore using power.

Because all of the cores are on the same clock tree, in order to add switches to be able to turn off the cores, it is estimated that the number of the gates required on the processor would increase by 15%. Further, even with such ability to turn off different cores, typically in order to save gates cores would be grouped together. Thus a tradeoff exists between the number of gates and the granularity of the core groups.

For example, cores may be grouped into 25 cores for each gated switch. However, in this case, if a program includes 27 loops then 2 groups would still need to be turned on. The first group of 25 cores would all perform useful functionality. In the second group, only 2 cores perform useful functions, leaving the remaining 23 cores to be clocked and draining power without useful functionality.

Further, in order to be able to turn off cores to save power, time is required to turn off or turn on certain core groups, introducing unwanted latency into the processor.

The power usage on a multicore processor should be as low as possible. This allows for the use of the multiprocessor in applications that have limited power supplies, such as mobile devices. The power usage on a multicore or many-core processor may be defined in GFLOPS/W. Ideally, a multicore processor would maximize the number of GFLOPS/W.

Synchronous core 110 needs a global clock tree. However, as the number of cores increases up to hundreds and thousands, it may become less practical to have a global tree on a big die.

If the number of cores increases to hundreds or thousands, heat reduction becomes an issue for a multi-core processor. The heat reduction issue, in turn, presents a difficulty for backend routing.

Figure 3:
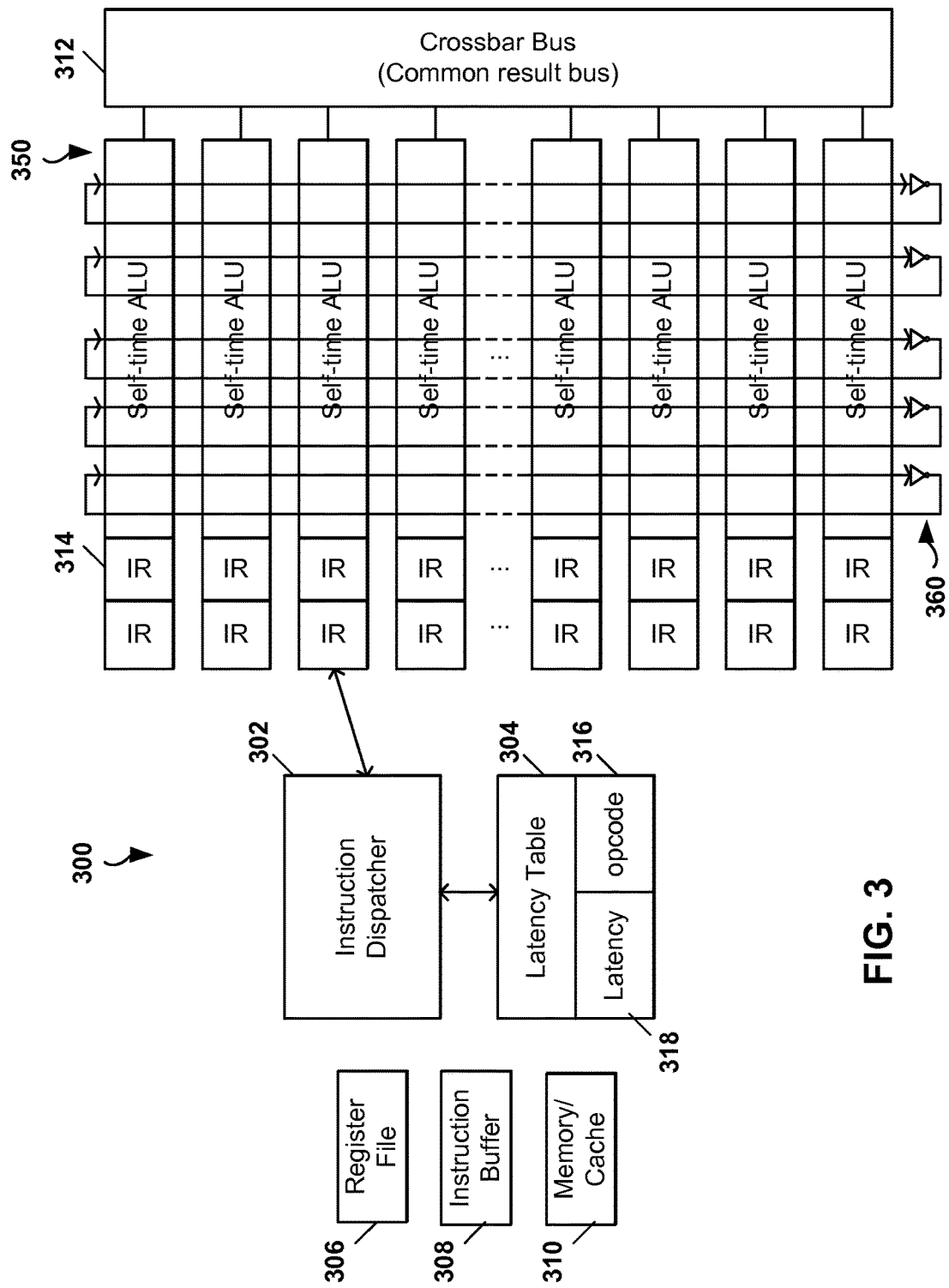
FIG. 3 is a block diagram illustrating an example single core, self-timed processor.

Reference is now made to FIG. 3, which shows one example of a lower power processor architecture 300 in a single core environment. The architecture or system 300 includes a plurality of self-timed (asynchronous) arithmetic logic units (ALUs), which may also be referred to as execution units (XU), 350 in parallel. Each ALU 350 may include one or more successive processing stages (each for example having an asynchronous logic block and an associated self-clock generator).

The processor in FIG. 3 is a token based, self-timed processor. The processor of FIG. 3 is configured with mechanisms to preserve the program counter order, detect and resolve structural hazards, and detect and resolve data hazards. The processor of FIG. 3 utilizes tokens within token rings 360 to preserve the program counter order and detect and resolve structural hazards. Further, as described below, a crossbar bus and feedback engine can combine to detect and resolve data hazards.

The system 300 also includes an instruction dispatcher 302, a latency table 304, a register file 306, an instruction buffer 308, memory 310, and a crossbar bus 312. The instruction buffer 308 holds instructions for dispatch, and the instruction dispatcher 302 is configured to dispatch one or more instructions to the ALUs 350.

Memory 310 and the register file 306 provide typical data and register storage functions.

The instruction dispatcher 302 accesses the latency table 304 to determine associations between processing latency delays and instructions (e.g., opcodes). The latency or delay table 304 stores associations or correspondence between different opcodes 316 and pre-defined process delay times in memory.

The instruction dispatcher 302 fetches instructions from instruction buffer 308 and selects/dispatches instructions to one or more instruction registers or buffers 314 associated with each of the ALUs 350. Such dispatching of instructions may, for example, be a first in, first out dispatch (FIFO).

When a particular register or buffer 314 is full, the instruction dispatcher is notified and delays sending additional instructions.

With respect to a given instruction, the instruction can be used to identify the type of processing that needs to be performed. Upon dispatch of the instruction, the dispatcher 302 also knows which ALU 350 will perform the processing. With this information, the self-clocked generator is controlled or configured to generate a signal that the processing is complete in accordance with the pre-defined delay time associated with the identified type of processing.

In one example for illustration purposes only, an add instruction is associated with a first processing latency (e.g., 1 nanosecond) while a multiply instruction is associated with a second processing latency (e.g., 4 nanoseconds). The distinct opcodes 316 for these two instructions are stored in the table 304 along with their assigned pre-defined processing delays (latency) 318. The instruction (in this example, a multiply instruction) is dispatched to a given ALU 350 and, based on the content of the dispatch instruction, the table 304 is accessed. From this, it is determined that the pre-defined processing delay of the given ALU 350 needs to be 4 nanoseconds. The generator is then controlled or programmed to generate its self-clocking signal according to this requirement when the particular instruction is being executed by the given ALU 350.

Table 304 may include any number of corresponding pairs of opcode-delay combinations, depending on the number of different instructions and the amount of processing delay necessary for the instructed processing. Each additional instruction may have its own assigned processing latency.

As the ALUs are asynchronous, a plurality of token rings 360 may be used by processor 300 to control access to shared resources and for instruction allocation, among other functionality.

Specifically, ALUs 350 are logically linked using several asynchronous signals, referred to as tokens. As used herein, a token is a special asynchronous edge-sensitive signal that sequentially goes through the plurality of ALUs. After the token is issued from ALU-N, the token signal passes into an inverter that inverts the signal and then passes it back to ALU-0.

When a token reaches an ALU, the ALU "owns" the token. This means that only one ALU holds ownership of a given token at an instant of time. Since the token is only owned by one ALU, the token provides a mechanism for resolving structural hazards for common resources.

An ALU which owns a token may not consume it immediately, but instead may lock it at a latch. Specifically, reference is now made to FIG. 4, which shows an example token processing logic at each of ALUs 350.

In particular, the processing logic 400 includes the latch 410. In one embodiment, latch 410 may be a set-reset (SR) flip flop. The inputs to latch 410 are provided from the previous ALU.

An ALU may decide either to consume the token or to pass the token signal to the next ALU as quickly as possible if deciding not to consume it. Typically an ALU may make a decision about a token prior to the token's arrival.

Figure 4:
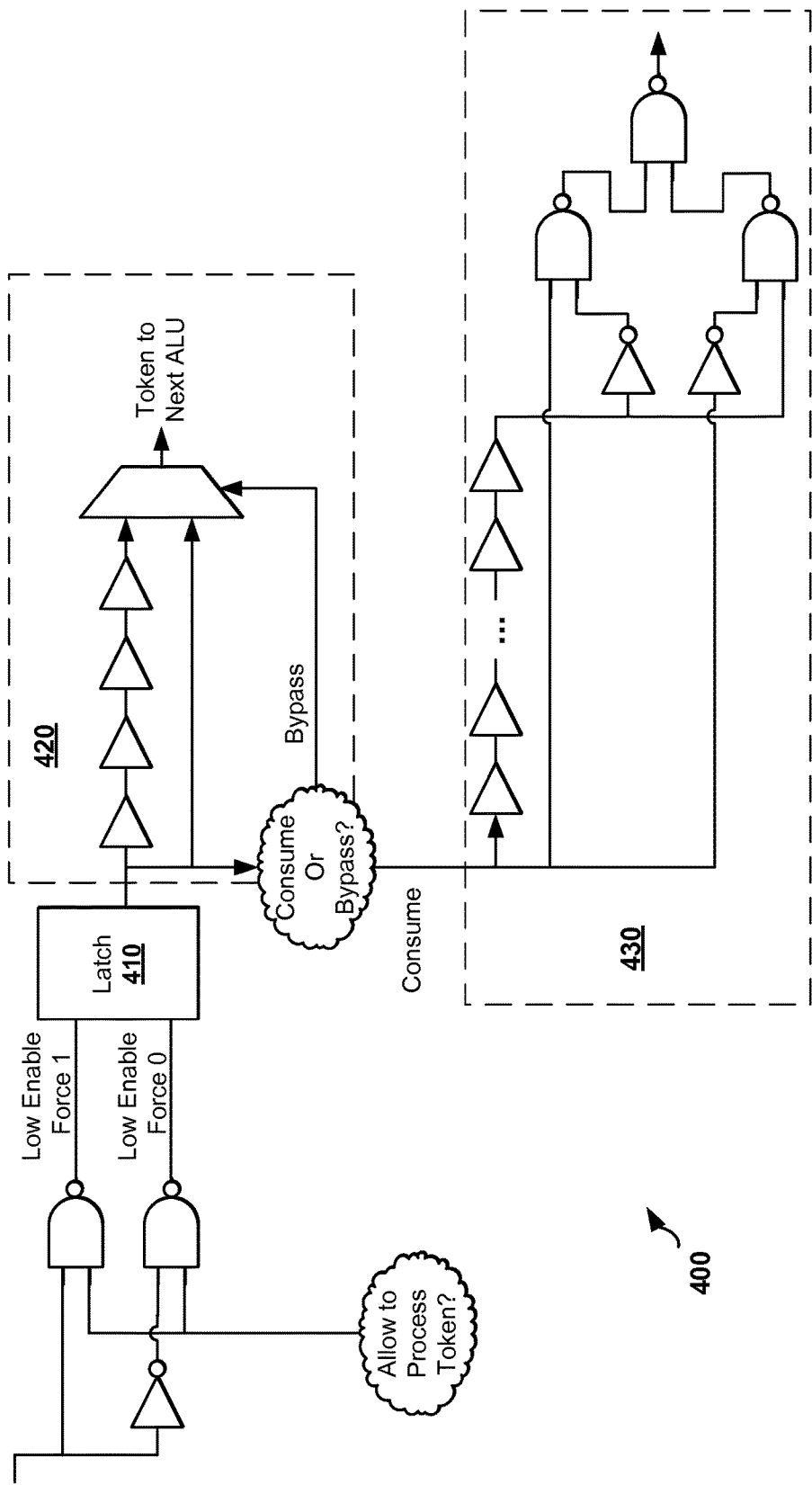
FIG. 4 is a block diagram illustrating an example of processing logic in an ALU for token handling.

As seen by the processing logic 400 of FIG. 4, bypass logic 420 is used to pass the token to the next ALU as quickly as possible. Conversely, if the token is to consumed by the ALU then the consumption logic 430 is utilized at the ALU.

To form a processor pipeline, a token system may be implemented with two aspects. In a first aspect an intra-ALU token gating system is provided. In particular, certain tokens can be used to gate other tokens. In other words, the releasing of one token may become a condition to consume another token. The gating signals from the preceding tokens are input into consumption condition logic of the gated token.

Figure 5:
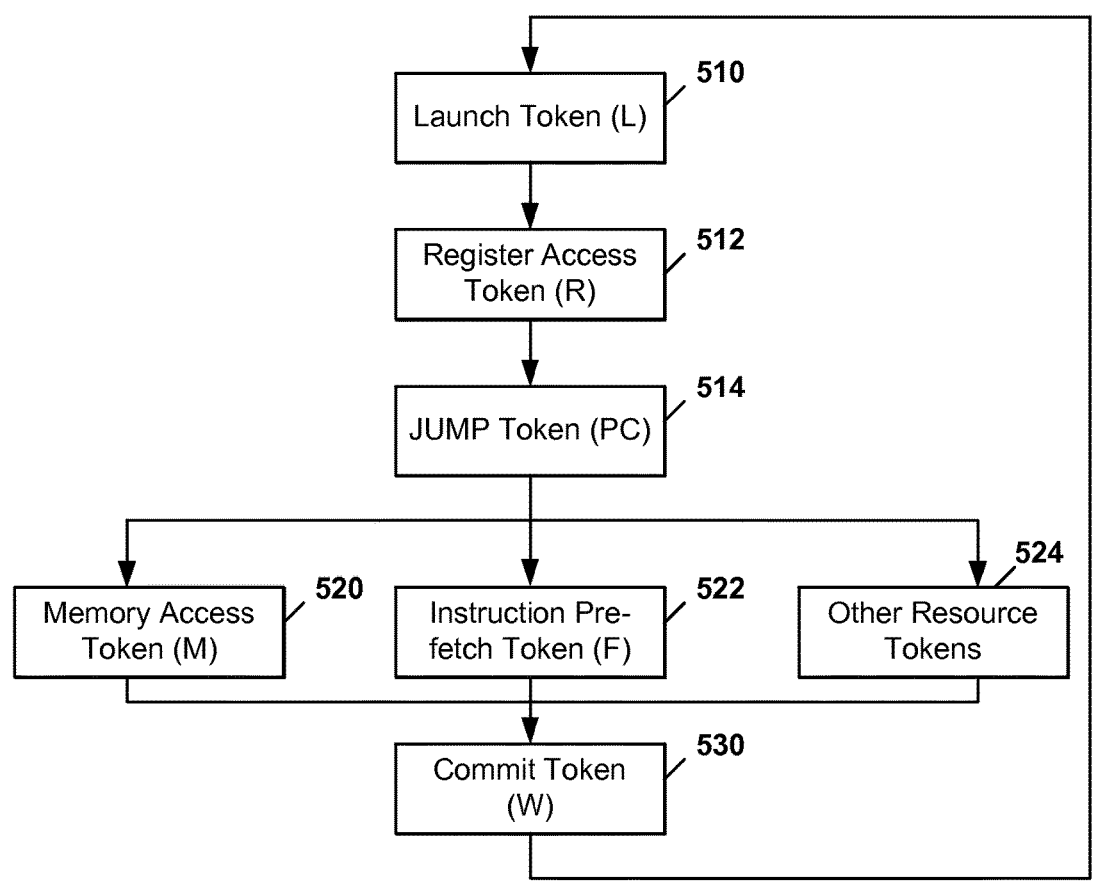
FIG. 5 is block diagram showing an example of token interdependency.

Reference is made to FIG. 5. As seen in FIG. 5, a plurality of tokens may be used in one example embodiment of a processor 300. In particular, a launch token 510 may be utilized to indicate a start of an instruction. A register access token 512 may be utilized to read from register files. A JUMP token 514 may be used to decide to make a jump within program code.

Memory access token 520 may be used to send access addresses to memory. An instruction pre-fetch token 522 may be used to fetch the next instruction and other resource tokens 524 may be used to control access to other shared resources.

Further, a commit token 530 may be used to commit results to a register.

Thus, the launch token 510 may generate an active signal to the register access token 512 when the launch token 510 is released to the next ALU. This guarantees that an ALU will not read the register file until the instruction is "officially" started by the launch token 510.

Similarly, the register access token 512 may generate an active signal to the JUMP token 514. JUMP token 514 may generate an active signal to the memory access token 520, the instruction pre-fetch token 522 and/or the other resource tokens 524. Commit Token 530 may require an active signal from one or more of memory access token 520, the instruction pre-fetch token 522 and the other resource tokens 524 to allow the results to be committed.

Therefore, FIG. 5 illustrates a simplified prototype of a token gating relationship.

Figure 6:
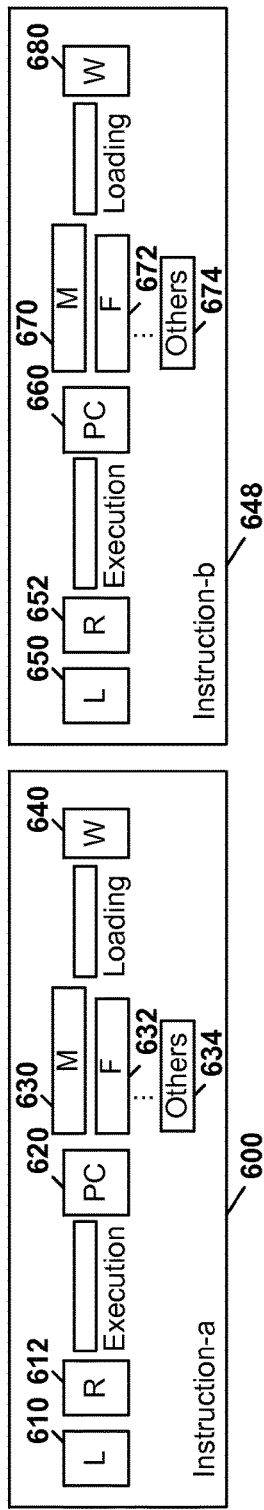
FIG. 6 is a block diagram showing an example of use of tokens for instruction processing within an ALU.

Referring to FIG. 6, the figure shows an example within a single ALU for processing instructions. As seen in FIG. 6, a first instruction is processed within block 600 and includes the latch token 610 followed by the register access token 612. The execution may then occur at the ALU after which the JUMP token 620 may be used if a jump is needed.

Following the jump decision, tokens for memory access 630, instruction pre-fetch 632 or other resource access 634 may be used. After a certain period, the commit token 640 may be used.

Subsequently, as shown by block 648, a second instruction may be processed in a similar manner, utilizing latch token 650, register access token 652, JUMP token 660, memory access token 670, instruction pre-fetch token 672, other resource tokens 674, as well as a commit token 680.

In a second aspect, a pipeline architecture may be achieved in the token system through an inter-ALU token passing system. In particular, a consumed token signal may trigger a pulse to a common resource. For example, the register access token triggers a pulse to the register file. The token signal for the register access token is then delayed for a period to ensure no structural hazard exists on a common resource before the token is released to the next ALU.

Figure 7:
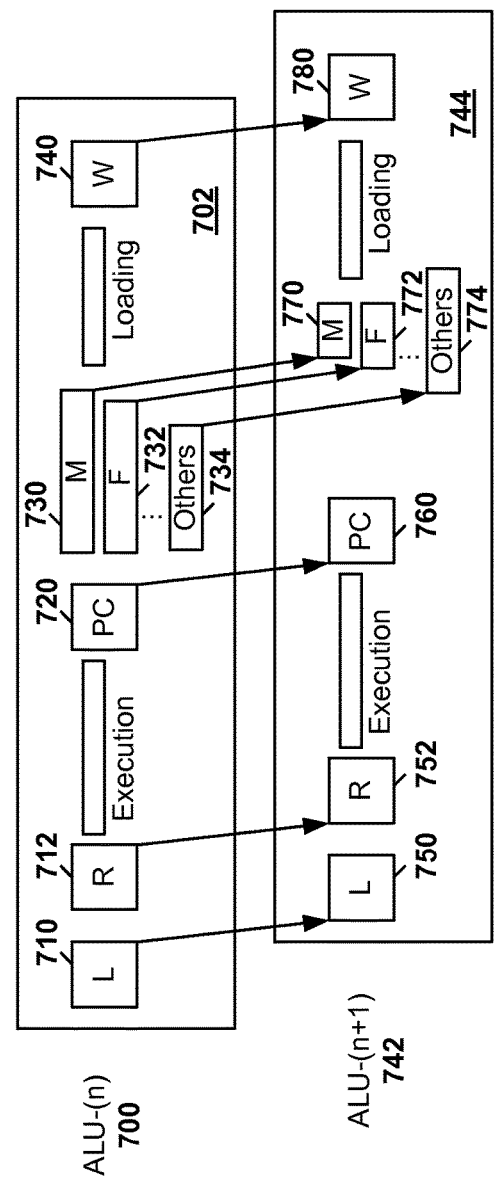
FIG. 7 is a block diagram showing an example of use of tokens for instruction processing between two ALUs.

For example, referring to FIG. 7, a first ALU 700 processes the tokens in block 702 in a manner discussed above with regard to FIG. 6. Specifically, ALU 700 first processes launch token 710 and then utilizes register access token 712. Similarly, if a JUMP decision is made then jump token 720 may be used. Memory access token 730, instruction pre-fetch token 732, and other resource tokens 734 may further be used.

Once processing for the instruction is completed, then a commit token 740 may be consumed.

A second ALU 742 has an execution block 744 which shows the consumed tokens from ALU 700 being passed to ALU 742. Thus, once the launch token 710 is consumed in ALU 700, the token may be passed to ALU 742 as shown by launch token 750 in block 744. Similarly, the register access token 712 is consumed and control is then passed to ALU 742, shown as register access token 752.

Control of the remaining tokens is passed to block 744, shown by JUMP token 760, memory access token 770, instruction pre-fetch token 772, other resource tokens 774 and commit token 780 within ALU 742 upon release by ALU 700.

Therefore tokens can be used to allow multiple ALUs to launch and commit instructions in the program code order, while avoiding structural hazards among the multiple ALUs.

Referring again to FIG. 3, outputs of ALUs 350 may be placed within a crossbar bus 312. In particular, the data hazard of the processor may be detected and resolved through a combination of a crossbar bus 312 and a feedback engine, which may be part of the instruction dispatcher 302.

The multiple ALUs 350 are linked by crossbar bus 312. For example, in one embodiment each ALU may have one output to the crossbar bus 312 as well as three inputs from crossbar bus 312.

In this case, a read-after-write (RAW) hazard may be avoided in accordance with the following. When an ALU writes to the crossbar bus, it may then broadcast a "done" signal on the bus to inform other ALUs.

When an ALU requests data from the crossbar bus, it monitors the "done" signal from a targeted ALU. Once the signal has been broadcast, the recipient ALU pulls the data from the crossbar. Until the done signal is raised by the targeted ALU, the recipient ALU waits. In this way, the data hazard among instructions on different ALUs is resolved.

Register and memory commitment is performed in a post-commit mode. Specifically, writing to the register file and/or memory takes place after the commit token is released. Crossbar 312 plays a role of "register renaming" to avoid write-after-read and write-after-write hazards.

Data hazards are further detected by a feedback engine at the instruction fetch stage. Specifically, instructions that come from the instruction cache go through the feedback engine, which detects the data dependency based on a history table. The feedback engine may pre-decode the instruction to decide how many input operands the instruction requires. Afterwards, the feedback engine looks up the history table to determine whether a piece of data is on the crossbar or in a register file. If the data remains on the crossbar bus, the feedback engine calculates which ALU produced the data and this information is tagged to instructions dispatched to the ALUs.

A first ALU that is dependent on the results of the processing of a second ALU may monitor an address of the crossbar bus 312 to immediately be granted access to the results once the processing is completed at the second ALU. This saves time in accessing resources at the first ALU. The address at the crossbar bus may be provided to the first ALU by the instruction dispatcher 302.

The above processor, for example, is described in U.S. patent application Ser. No. 14/480,531 filed Sep. 8, 2014; U.S. patent application Ser. No. 14/480,556 filed Sep. 8, 2014; U.S. patent application Ser. No. 14/480,561 filed Sep. 8, 2014; and U.S. patent application Ser. No. 14/325,117 filed Jul. 7, 2014, the contents of all of which are incorporated herein by reference.

Figure 8:
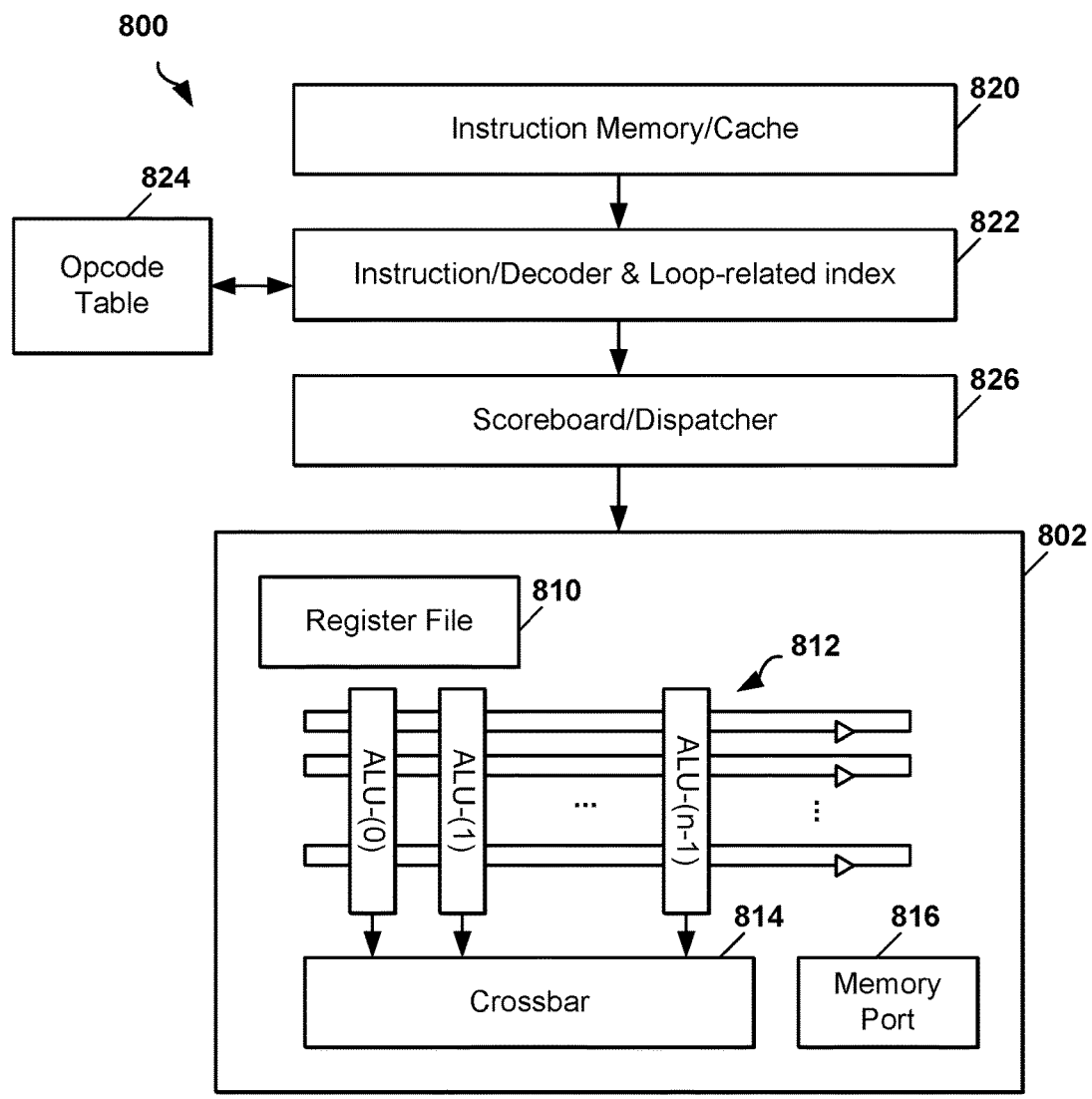
FIG. 8 is block diagram showing instruction flow in a single core, self-timed processor in accordance with one embodiment of the present disclosure.

Reference is now made to FIG. 8, which shows another embodiment of the self-timed processor of FIG. 3. As seen in FIG. 8, a single core DSP processor 800 has a core 802 that includes a register file 810, a plurality of ALUs 812, a crossbar 814 and a memory port 816. The functionality of such blocks is similar to that described above with regard to FIG. 3.

Further, the processor 800 includes an instruction memory or cache 820, an instruction decoder and loop related index 822 which receives both input from the instruction memory or cache as well as from an opcode table 824.

A scoreboard/dispatcher 826 provides instructions to the core.

Instructions are fetched from instruction memory 820 into an instruction buffer queue inside the instruction decoder 822. The instruction decoder 822 does the pre-decoding to find the loop related instructions, debugging related instructions, other special control instructions, among other functionality.

The instruction decoder then sends the opcode to the opcode table 824, which feeds back the predefined latency of the instruction. Instruction decoder 822 handles the hardware loop. It inputs instructions with the checked latency to dispatcher 826.

In one embodiment, the dispatcher 826 uses a scoreboard algorithm to detect and record the data dependency. Each dispatched instruction is registered into the scoreboard queue.

The dispatcher 826 then dispatches the instructions with associated latency information and data dependency information, to the self-timed, unpipelined ALU in a strict program counter order.

The processors of FIGS. 3 and 8 can function without the need for a global clock tree. A processor without need for a global clock tree may save, for example, up to 30% of power of a digital signal processor (DSP). Additionally, if the number of cores increases by 100s and 1000s, a global clock tree may not be possible to implement given the limitations on the processor die.

Further, if the number of cores increases to 100s or 1000s, heat reduction becomes important for a processor. The heat reduction issue presents difficulty for backend routing. A processor design may need to reduce the amount of power consumed globally and the power on every core may matter.

Specifically, a software application may not be able to use all of the cores of a processor all of the time. Some cores become idle. In the synchronous design, power gating is required to switch off idle cores. However, power gating needs a certain level of granularity as discussed above.

For example, it may be more power efficient to allocate a power to an area for a single core rather than a group of cores. If the cores are grouped together for gating, a processor has coarse granularity.

In contrast, when there is no clock on a self-timed core, the granularity becomes very fine and each core that enters into idle consumes very little power.

In accordance with one embodiment of the present disclosure, the processer of FIGS. 3 and 8 above is adapted to be used in a multi-core processor environment. The processor would have a plurality of self-timed cores which provides for lower power but with higher parallelism than conventional multi-core processors.

In accordance with one embodiment described below, a multi-core processor is provided which avoids a bottleneck in accessing instruction memory. Instead of each core fetching its own instruction from its own instruction memory, as is done in some current multi-core processors, the cores of the processor of the present embodiment do not have private instruction memory or space. Cores in the present embodiment share an instruction fetch unit. One instruction stream with some core index related tag is broadcast to all of the cores. Each core of the present embodiment may then decide whether or not to execute the particular instruction stream. Specifically, each core of the processor of the present disclosure has an index and can decide, based on the core index related tag broadcast by the instruction fetch unit, whether a particular instruction should be executed by the core.

Figure 9:
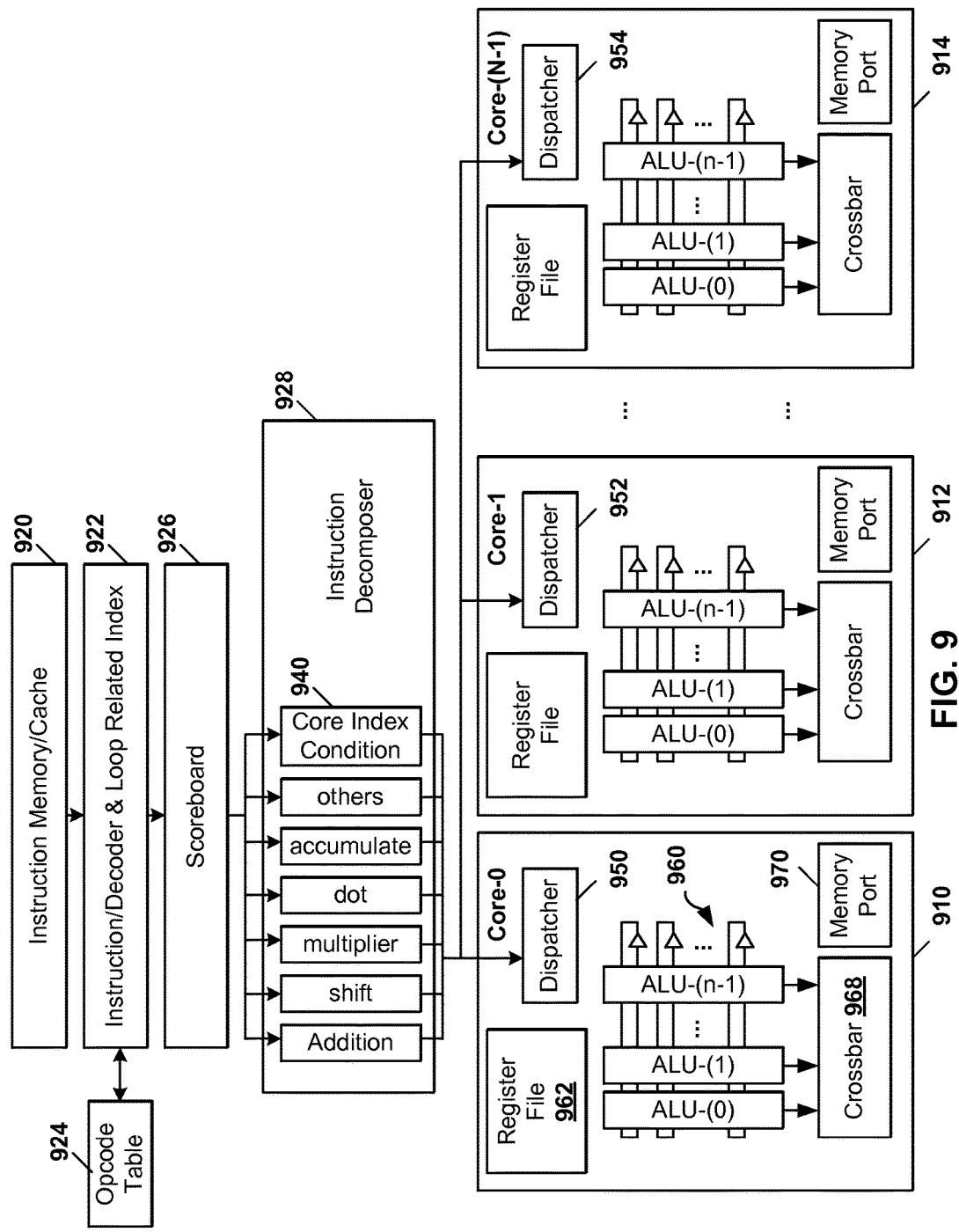
FIG. 9 is a block diagram illustrating one embodiment of a multi-core processor having many self-timed cores.

Reference is now made to FIG. 9, which shows one example of the multi core processor of the present disclosure. As seen in FIG. 9, a block diagram is provided of a many self-timed core processor architecture 900 which includes a plurality of cores. Such cores are as shown in the example of FIG. 9 as core-0 910, core-1 912 and core-(N-1) 914. In the example of FIG. 9, such cores are numbered 0 to Core-(N-1) for an N-core processor.

In the embodiment of FIG. 9, an instruction memory/cache 920 is common between all of the cores. Instruction memory/cache 920 includes program code which is fed to an instruction decoder block 922.

The instruction decoder 922 derives, from an instruction, a combination of flags and determines the opcode latency for the instruction using opcode table 924. The opcode latency may, for example, be a static latency with a margin added within opcode table 924.

The instruction decoder 922 may then map a loop-related index into core-index conditions. For example, the instruction decoder 922 may determine that only 25 cores are required to execute a loop and therefore assign a lane-index of less than or equal 24. The lane index is determined based on the number of iterations of a loop that need to be executed.

Scoreboard 926 may then dispatch the instructions by sending them through instruction decomposer box 928, which breaks the instruction into its components. In particular, the example of FIG. 9 has various instructions that may be provided as part of the program code including addition, shift, dot, accumulation, and a general other instruction block.

Further, a core index condition block 940 is provided which allows the selection of a number of cores that will process the instruction. In particular, as described above with regard to the instruction decoder 922, if the instruction decoder 922 determines that only 25 cores are required for the instruction, then core index condition block 940 may determine or attach that the only cores with an index value of less than or equal to 24 need to execute the instruction.

The instruction decomposer 928 thus creates a primitive that is broadcast to all of the cores.

Each core 910, 912, and 914 is self-timed. Each contains a dispatcher, shown by dispatchers 950, 952 and 954 in the example of FIG. 9. The dispatcher may be used by the core to decide whether or not to execute the instruction in terms of its own lane index and core index conditions. Thus, in the example of the above in which the loop needs to be executed by cores with an index value of less than or equal to 24, a core with an index of 25 will not execute the instruction because the condition is not satisfied.

Further, because each core is self-timed, the core will use minimal power at the dispatcher but saving overall power for processor 900 by not clocking or executing the instruction.

Each core 910, 912, 914 will execute the instruction only if the core index condition is satisfied. The combination of flags from instruction decoder 922 are used to configure the self-timed ALUs in the cores that perform the operation.

If the core is used, the dispatcher 950 is coupled to each execution unit or ALU within its processing core, and is configured to receive the primitive and dispatch instructions to each of the execution units if the index of the processing core is within the core index of the primitive.

As with the cores described above with regard to FIGS. 3 and 8, each core has a plurality of self-timed ALUs, shown in core 910 as ALUs 960. The cores may use tokens for access to common resources as described above.

Further, each core has its own dedicated register file, for example as shown in core 910 as register file 962.

Output from ALUs 960 may be provided to a crossbar 968 having similar functionality to that described above with regard to FIGS. 3 and 8. As seen in the example of FIG. 9, each core has its own crossbar.

Similarly, cores 912 and 914 have a plurality of ALUs and a crossbar.

Each of cores 910, 912 and 914 further have a memory port, for example, as shown with regard to core 910 as memory port 970. Memory port 970 is used to access the memory locations on the processor.

Dispatchers 950, 952, and 954 in each core are also responsible for providing a flush for the particular core.

Once the processing at each core is completed, the results may be accumulated through a clocked circuit (not shown).

From the example of FIG. 9 above, multiple self-timed cores share an instruction decoder to generate one combination of operation flags. Since the cores execute the same instruction stream but with different loop related indexes, the latency is similar. Further, multiple self-timed cores share the same latency controller because they execute the same instruction stream but with different loop related indexes.

Further, the embodiment of FIG. 9 allows for some self-timed cores to execute nothing if the core index condition of the instruction does not match the index of a particular core. As no dynamic power is consumed on these cores, the overall processor saves power.

While the embodiment of FIG. 9 shows a processor with a single instruction memory/cache 920, instruction decoder 922, scoreboard 926 and instruction decomposer 928, the present disclosure could be implemented on a processor having two or more instruction memories/caches 920, instruction decoders 922, scoreboards 926 and instruction decomposers 928, each serving a subset of the plurality of cores. Further, the embodiment of FIG. 9 could be used as part of any processor having other clocked or self-timed cores, and thus be a sub-component of the overall processor.

Figure 10:
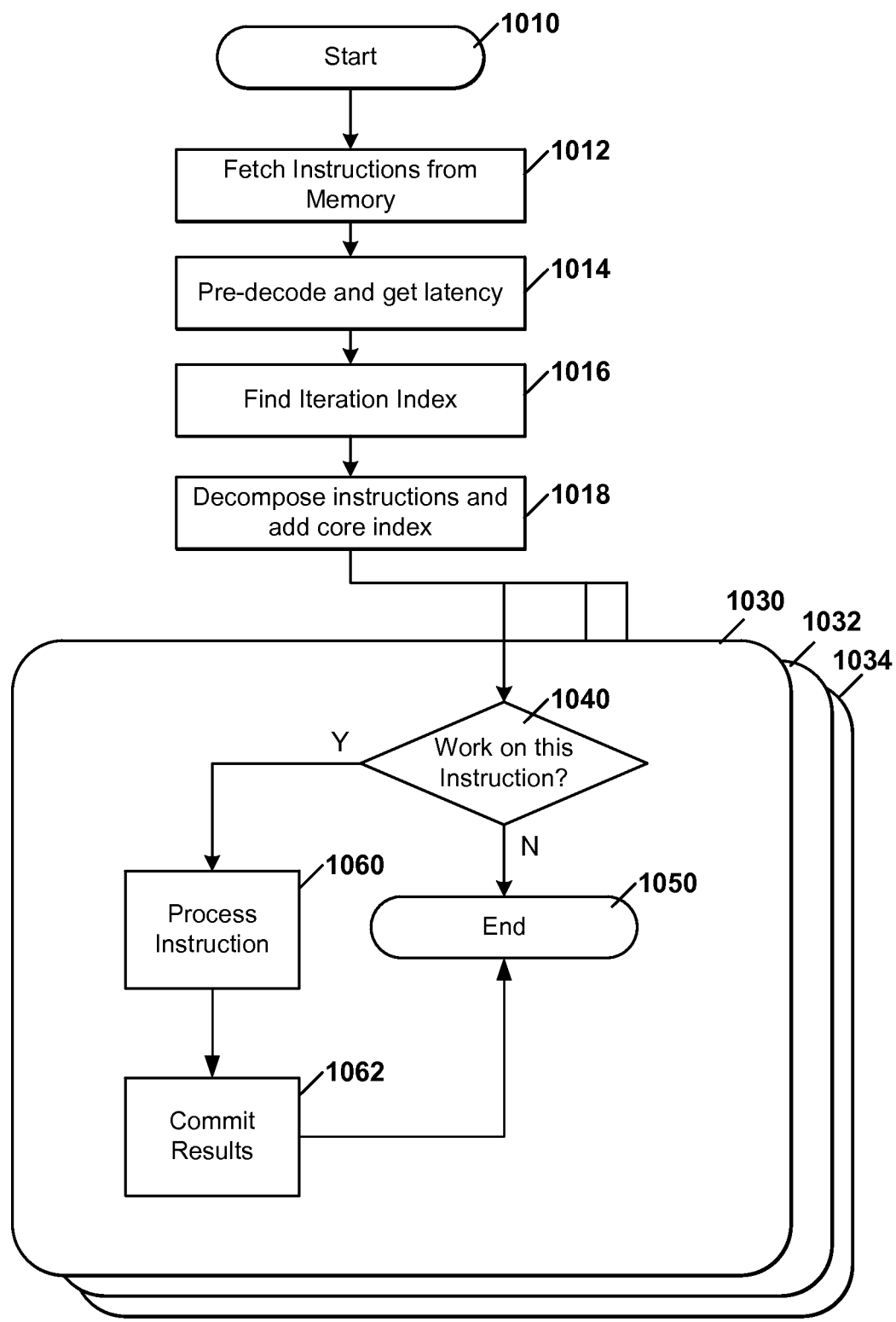
FIG. 10 is a process diagram showing an example instruction flow in a multi-core processor having many self-timed cores.

Reference is now made to FIG. 10, which shows a process diagram for the execution of instructions on a plurality of cores.

The process of FIG. 10 starts at block 1010 and proceeds to block 1012, where instructions may be fetched from instruction memory into an instruction buffer or queue at an instruction decoder.

The process then proceeds to block 1014, where the instruction decoder does pre-decoding to find loop related instructions, debugging related instructions and other special control instructions. Further, as part of block 1014, the instruction decoder sends the opcode to the opcode table, which feeds back the predefined latency for the instruction.

The process then proceeds to block 1016. A loop in a many core processor is handled totally differently from a single core loop. In a single core, a loop bodies are repeatedly fetched automatically to avoid program code jumping such as a flush. Conversely, in a many core example, each core executes one loop body and the loop is interpreted as a one iteration index loop body or an iteration indexed instruction stream. Thus, at block 1016, an iteration index is found.

At block 1018, the instruction decoder inputs the instruction stream into the scoreboard 922, which detects and register the data dependency within an instruction stream. The registered instruction, plus the latency, iteration index and data dependency information is input to an instruction decomposer. The instruction decomposer decomposes an instruction into the operation flags, operands, data dependencies and replaces the core index by a loop index. Such information consists of a primitive that is broadcast to all cores.

In particular, as shown in FIG. 10, the output from block 1014 is broadcast to all the cores, shown by blocks 1030, 1032, and 1034 in the embodiment of FIG. 10.

When the dispatchers in each core receive the primitive broadcast from the instruction decomposer, a first check, shown by block 1040, is made to determine whether the domain of the core index matches the core and thus whether or not the core needs to execute the instruction or not. If not, the process proceeds to block 1050 and ends (thereby waiting for the next instruction broadcast to the dispatcher).

Conversely, if the lane index of the instruction matches the index of a particular core, the process proceeds to block 1060 in which the instructions are processed. The results of the processing can then be committed, as shown in block 1062, and the processing of that instruction ends at block 1050. The results of the processing may then be used in a clocked portion of the processor (not shown).

Thus, the embodiments of FIGS. 9 and 10 overcome a bottleneck to access the instruction memory by using a common instruction fetch unit. Each self-timed core can work slower than a single core processor but by utilizing a plurality of such cores, a processor may achieve performance enhancements in terms of overall capacity of the processor.

For example, using a highly parallelized program such as a Fast Fourier Transform, a significant time performance enhancements may be achieved over conventional single core processors.

Further, the reduction in the power consumption of the many core processor allows it to be used in situations where a power source is limited, such as for a user equipment which utilizes a battery. The reduction in power compared to the conventional multi-core processors, as well as the corresponding reduction and heat output, is advantageous in such situations. However, the present disclosure is not meant to be limited to such applications and the processor may be deployed in any environment where current processors are dispatched.

The use of the term many core and multi-core processor in the above is not limiting. The terms could be used interchangeably, and the present disclosure is not limited to a processor with any particular number of cores.

Figure 11:
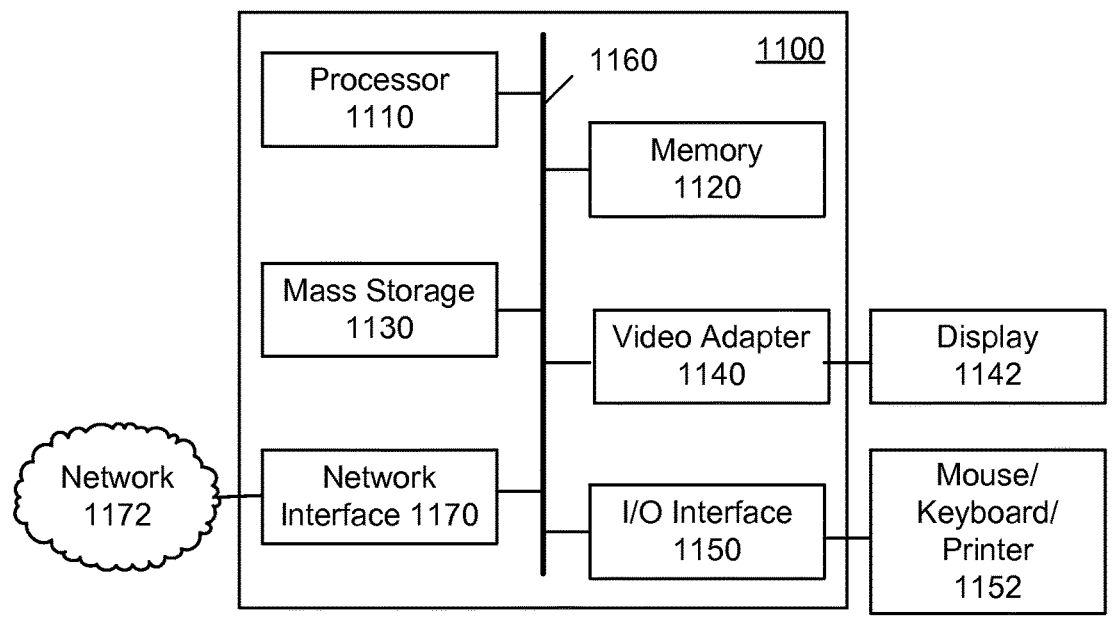
FIG. 11 is a block diagram illustrating a computing platform.

The processor described above may be used in any computing system or device. For example, FIG. 11 is a block diagram of a processing system 1100 that may be used with the processor and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1100 may comprise a processing unit equipped with one or more input/output devices, such as a speaker, microphone, mouse, touchscreen, keypad, keyboard, printer, display, and the like. The processing unit may include a many core processor 1110, memory 1120, a mass storage device 1130, a video adapter 1140, and an I/O interface 1150 connected to a bus 1160.

The bus 1160 may be one or more of any type of several bus architectures including a memory bus or memory controller, a peripheral bus, video bus, or the like. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1130 may comprise any type of storage device configured to store data, programs, and other information and to make the data, programs, and other information accessible via the bus. The mass storage device 1130 may comprise, for example, one or more of a solid state drive, hard disk drive, a magnetic disk drive, an optical disk drive, or the like.

The video adapter 1140 and the I/O interface 1150 provide interfaces to couple external input and output devices to the processing unit. As illustrated, examples of input and output devices include the display 1142 coupled to the video adapter and the mouse/keyboard/printer 1152 coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit 1100 also includes one or more network interfaces 1170, which may comprise wired links, such as an Ethernet cable or the like, and/or wireless links to access nodes or different networks. The network interface 1170 allows the processing unit to communicate with remote units via the networks. For example, the network interface 1170 may provide wireless communication via one or more transmitters/transmit antennas and one or more receivers/receive antennas. In an embodiment, the processing unit 1100 is coupled to a local-area network or a wide-area network, shown as network 1172, for data processing and communications with remote devices, such as other processing units, the Internet, remote storage facilities, or the like.

Figure 12:
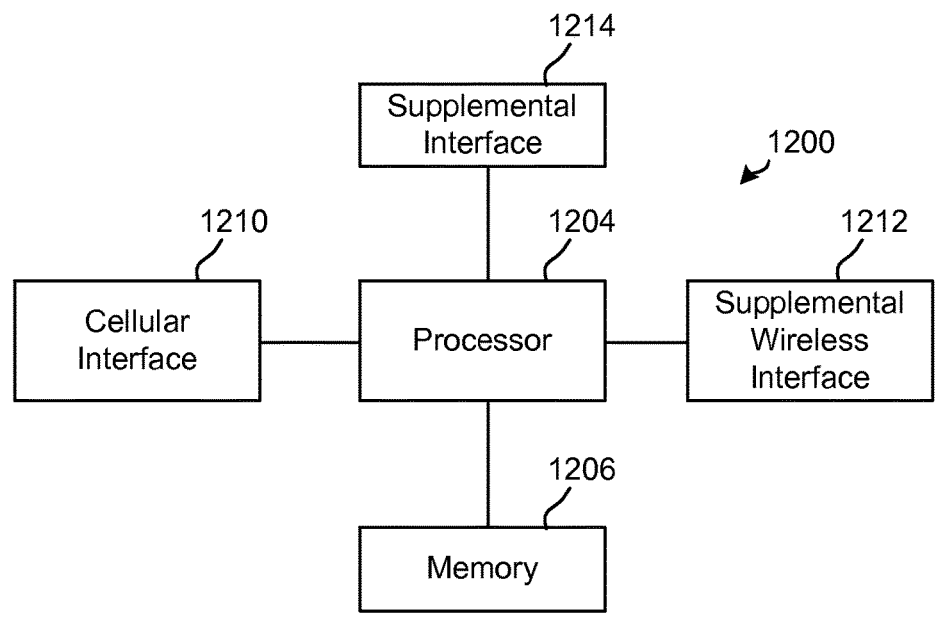
FIG. 12 illustrates a block diagram of an embodiment communications device.

FIG. 12 illustrates a block diagram of an embodiment of a communications device 1200, which may be equivalent to one or more devices (e.g., UEs, NBs, etc.) discussed above. The communications device 1200 may include a many core processor 1204, such as that described with regards to FIGS. 9 and 10 above. Communications device 1200 may further include a memory 1206, a cellular interface 1210, a supplemental wireless interface 1212, and a supplemental interface 1214, which may (or may not) be arranged as shown in FIG. 12. The processor 1204 may be any component capable of performing computations and/or other processing related tasks, and the memory 1206 may be any component capable of storing programming and/or instructions for the processor 1204. The cellular interface 1210 may be any component or collection of components that allows the communications device 1200 to communicate using a cellular signal, and may be used to receive and/or transmit information over a cellular connection of a cellular network. The supplemental wireless interface 1212 may be any component or collection of components that allows the communications device 1200 to communicate via a non-cellular wireless protocol, such as a Wi-Fi or Bluetooth protocol, or a control protocol. The device 1200 may use the cellular interface 1210 and/or the supplemental wireless interface 1212 to communicate with any wirelessly enabled component, e.g., a base station, relay, mobile device, etc. The supplemental interface 1214 may be any component or collection of components that allows the communications device 1200 to communicate via a supplemental protocol, including wire-line protocols. In embodiments, the supplemental interface 1214 may allow the device 1200 to communicate with another component, such as a backhaul network component.

Additional features and advantages of the present disclosure will be appreciated by those skilled in the art.

Those skilled in the art will appreciate that although the above discussion has centered around a processor with a plurality of self timed cores, it should understood that the same teachings would apply to the self timed core in a hybrid processor having both self timed cores and cores that shared a common clocking signal.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A self-timed parallelized multi-core processor comprising: a plurality of self-timed processing cores, each core having a unique core index and a dispatch unit; an instruction decoder unit configured to: receive a program code instruction, determine an operating code and a latency associated with the operating code for the program code instruction, and assign a loop index to the program code instruction; and an instruction decomposer unit coupled to the instruction decoder unit, the instruction decomposer configured to: create a primitive based on a decomposition of the program code instruction; replace the loop index in the primitive with a primitive index; and broadcast the primitive to each of the plurality of self-timed processing cores; wherein the plurality of self-timed processing cores is coupled to the instruction decomposer unit, and wherein each dispatch unit is configured to compare the primitive index broadcast by the instruction decomposer unit to the core index of the processing core corresponding to the dispatch unit, and wherein each core is configured to act on the primitive when the core index is within a threshold of the primitive index.

2. The multi-core processor of claim 1, wherein each processing core in the plurality of processing cores comprises: a plurality of parallel asynchronous execution units, each execution unit configured to generate an instruction execution result; and wherein the dispatch unit coupled to each execution unit is configured to receive the primitive and dispatch instructions to each of the execution units when the core index is within the threshold of the primitive index.

3. The multi-core processor of claim 2, wherein the plurality of parallel asynchronous execution units in each processing core uses at least one token to control access to common resources and to keep the access or operation order among the plurality of parallel asynchronous execution units.

4. The multi-core processor of claim 2, wherein each processing core further comprises a crossbar memory for storage of the instruction execution result of each execution unit.

5. The multi-core processor of claim 2, wherein the instruction execution unit is an arithmetic logic unit (ALU).

6. The multi-core processor of claim 1, wherein the primitive comprises at least one of operation flags, operands, and data dependency.

7. The multi-core processor of claim 1, where each processing core is configured to execute the same primitive but with a different loop index.

8. The multi-core processor of claim 1, further comprising a scoreboard unit between the instruction decoder unit and instruction decomposer unit, wherein the scoreboard unit is configured to register data dependencies of the program code instruction.

9. The multi-core processor of claim 1, wherein results from processing at each core are provided to a memory location using a memory port.

10. The multi-core processor of claim 1, wherein acting on the primitive comprises acting on the primitive in accordance with the latency.

11. A method of operating a self-timed parallelized multi-core processor, the method comprising:
fetching a program code instruction from memory;
decoding the program code instruction and obtaining a latency and a loop index;

assigning the loop index to the program code instruction;

creating a primitive based on a decomposition of the program code instruction and by replacing the loop index in the primitive with a primitive index;

broadcasting the primitive to each of the plurality of processing cores, each processing core having a unique core index and a dispatch unit;

in response to comparing, by each dispatch unit, the primitive index broadcast by an instruction decomposer unit to the core index corresponding to the respective dispatch unit:

at each processing core, acting on the primitive when the respective core index is within a threshold of the primitive index.

12. The method of claim 11, wherein each processing core in the plurality of processing cores comprises: a plurality of parallel asynchronous execution units, each execution unit configured to generate an instruction execution result; and a dispatching unit coupled to each execution unit and configured to receive the primitive and dispatch instructions to each of the execution units when the core index is within the primitive index.

13. The method of claim 12, further comprising using at least one token for the plurality of parallel asynchronous execution units to control access to common resources and to keep the access or operation order among the plurality of parallel asynchronous execution units.

14. The method of claim 12, further comprising storing instruction execution results from the plurality of parallel asynchronous execution units in a crossbar memory in each of the processing cores.

15. The method of claim 12, wherein the instruction execution unit is an arithmetic logic unit (ALU).

16. The method of claim 11, wherein creating the primitive comprises decomposing the program code instruction into operation flags, operands, and data dependency.

17. The method of claim 11, further comprising executing the same primitive with a different loop index at each core if the core has a core index within the range of the primitive index.

18. The method of claim 11, further comprising registering data dependencies of the program code instruction at a scoreboard unit prior to creating the primitive.

19. The method of claim 11, further comprising providing results from processing at each core to a memory location using a memory port.

20. The method of claim 11, wherein acting on the primitive comprises acting on the primitive in accordance with the latency.

* * * * *